(12) United States Patent
Trautenberg

(10) Patent No.: US 7,869,949 B2
(45) Date of Patent: Jan. 11, 2011

(54) VEHICLE SYSTEM AND EARTH-BASED RECEIVER SYSTEM

(75) Inventor: Hans Trautenberg, Ottobrunn (DE)

(73) Assignee: Astrium GmbH, Munich (DE)

( * ) Notice: Subject to any disclaimer, the term of this patent is extended or adjusted under 35 U.S.C. 154(b) by 869 days.

(21) Appl. No.: 11/792,526

(22) PCT Filed: Dec. 1, 2005

(86) PCT No.: PCT/DE2005/002166

§ 371 (c)(1),
(2), (4) Date: Jun. 7, 2007

(87) PCT Pub. No.: WO2006/060994

PCT Pub. Date: Jun. 15, 2006

(65) Prior Publication Data

US 2009/0284410 A1  Nov. 19, 2009

(30) Foreign Application Priority Data

Dec. 8, 2004  (DE) ........................ 10 2004 059 229

(51) Int. Cl.
*G01S 1/00* (2006.01)

(52) U.S. Cl. .................. 701/214; 701/213; 342/357.22; 342/357.51

(58) Field of Classification Search ........................ None
See application file for complete search history.

(56) References Cited

U.S. PATENT DOCUMENTS 6,944,534 B2   9/2005  Trautenberg (Continued)

FOREIGN PATENT DOCUMENTS

DE  101 57 619 C2  5/2003

(Continued)

OTHER PUBLICATIONS

Oehler, V. et al., "User Integrity Risk Calculation at the Alert Limit without Fixed Allocations", ION GNSS 17th International Technical Meeting of the Satellite Division, Sep. 21-24, 2004, pp. 1645-1652, XP-002375519, Long Beach, CA.

(Continued)

*Primary Examiner*—Michael J. Zanelli
(74) *Attorney, Agent, or Firm*—Crowell & Moring LLP

(57) ABSTRACT

In a vehicle, a vehicle system is provided that includes a position determination module for determining the position of the vehicle using an estimation of the error of satellite signals which are received by an earth-based receiver system, and an integrity module for determining an integrity risk for the position data for a vehicle, the risk being derived using time determinations performed by a satellite navigation system. When a threshold value for the integrity risk for the position data is exceeded, the vehicle system generates a warning signal which, by means of modules that are connected to the vehicle system, is designed to prevent the use of the position data for the vehicle. The integrity risk is determined using an estimated value for the error in the received satellite signal, and the receiver system functionally interacts with a plurality of satellites to determine and transmit data to a vehicle system containing a position determination module for determining the position of the vehicle.

5 Claims, 1 Drawing Sheet

U.S. PATENT DOCUMENTS

| | | | |
|---|---|---|---|
| 7,138,942 | B2 | 11/2006 | Trautenberg |
| 2004/0037252 | A1 | 2/2004 | Trautenberg |
| 2005/0093739 | A1* | 5/2005 | DiLellio ............... 342/357.06 |

FOREIGN PATENT DOCUMENTS

| | | |
|---|---|---|
| DE | 102 19 701 A1 | 11/2003 |
| DE | 102 45 967 A1 | 4/2004 |
| EP | 1 637 899 A1 | 3/2006 |

OTHER PUBLICATIONS

Oehler, V. et al., "The Galileo Integrity Concept", ION GNSS 17$^{th}$ International Technical Meeting of the Satellite Division, Sep. 21-24, 2004, pp. 604-615, XP-002375520, Long Beach, CA.

Dixon, C. S. et al., "Integrity Concepts for Galileo's Local Component", ION GPS/GNSS 2003, Sep. 9-12, 2003, pp. 603-615, XP-002375521, Portland, OR.

Herráiz-Monseco, E. et al., "A New System Level Integrity Concept for Galileo: The Signal in Space Accuracy", ION GPS 2001, Sep. 11-14, 2001, pp. 1304-1316, XP-002375522, Salt Lake City, UT.

International Search Report dated Apr. 25, 2006 including English translation of pertinent portion (Six (6) pages), PCT/ISA/237 including English translation of Supplementary Sheets (Thirteen (13) pages).

* cited by examiner

VEHICLE SYSTEM AND EARTH-BASED RECEIVER SYSTEM

CROSS REFERENCE TO RELATED APPLICATIONS

This application is a national stage of PCT International Application No. PCT/DE2005/002166, filed Dec. 1, 2005, which claims priority under 35 U.S.C. §119 to German Patent Application No. 10 2004 059 229.2, filed Dec. 8, 2004, the entire disclosures of which are herein expressly incorporated by reference.

BACKGROUND AND SUMMARY OF THE INVENTION

The present invention relates to a vehicle system and an earth-based receiver system for controlling operating states of a vehicle system or of a vehicle on the basis of satellite signals, using an estimation of error from received satellite signals.

Systems for determining the integrity of position solutions derived from satellite signals are known from the prior art. It is assumed that, after application of a correction to the satellite data made by an optional base system, all satellite signals that are not recognized as erroneous by the earth-based receiver system may be described by an error distribution, and that the signals have an expected value of zero and may be described by a standard deviation.

Such a system is known from European patent document EP 04 022 307.5, for which it is assumed that there are a plurality of satellite signals that are applicable for this assumption, but that for each vehicle system there is a satellite signal having the associated data for which this assumption is not applicable. For this satellite signal and the associated data it is then assumed that for the satellite in the earth-based receiver system the expected value of the error distribution is the threshold value that is propagated for this satellite, and that the variance of the error is the variance of the error estimation which is propagated by the receiver system.

The object of the present invention is to provide a system which allows the integrity of position solutions derived from satellite signals to be determined with greater reliability and lower alert limits.

According to the present invention, a vehicle system in a vehicle includes a position determination module for determining the position of the vehicle using an estimation of the error of satellite signals which are received by an earth-based receiver system, and an integrity module for determining an integrity risk for the position data for a vehicle. The integrity risk is derived using time determinations performed by a satellite navigation system, and when a threshold value for the integrity risk for the position data is exceeded, the vehicle system generates a warning signal which, by means of modules that are connected to the vehicle system, is designed to prevent the use of the position data for the vehicle, wherein the integrity risk is determined using an estimated value for the error in the received satellite signal, wherein only satellite signals and satellite data, and optionally correction data, are used which as a whole have not been transmitted by the earth-based receiver system to the vehicle system as erroneous, wherein this estimated value is set to be equal to the received threshold value, wherein optionally the algebraic signs of these estimated values are selected so as to maximize the integrity risk, and wherein the accuracy of this estimated value is set to be equal to the deviation accuracy transmitted from the receiver system to the vehicle system.

Also provided according to the invention is a receiver system which functionally interacts with a plurality of satellites to determine and transmit data to a vehicle system containing a position determination module for determining the position of the vehicle, and an integrity module for determining the probability that the position error is greater than an alert limit, whereby the receiver determines:

the position and the instantaneous time of the transmitting satellite, the deviation between the satellite position and satellite time predicted for the particular point in time and the estimated satellite position and satellite time, the deviation between the nominal signal propagation from the satellite to the vehicle and the estimated actual signal propagation from the satellite to the vehicle, the deviation accuracy, i.e., the accuracy with which this deviation is determined, a threshold value above which the receiver system identifies the respective satellite signal received by same as erroneous, and the information concerning which satellites are recognized as defective by the receiver system, wherein the receiver system transmits the following as input data for the vehicle system:

the accuracy of the error estimation, and the information concerning which satellites are recognized as defective by the receiver system, wherein the receiver system also transmits as input data for the vehicle system a threshold value above which the receiver system identifies the respective satellite signal received by same as erroneous.

Other objects, advantages and novel features of the present invention will become apparent from the following detailed description of the invention when considered in conjunction with the accompanying drawings.

BRIEF DESCRIPTION OF THE DRAWINGS

The present invention is described with reference to the accompanying FIG. 1, which schematically shows the interaction of satellites, base systems, and a vehicle containing a vehicle system in which such a position determination occurs.

DETAILED DESCRIPTION OF THE DRAWINGS

Figure 1:
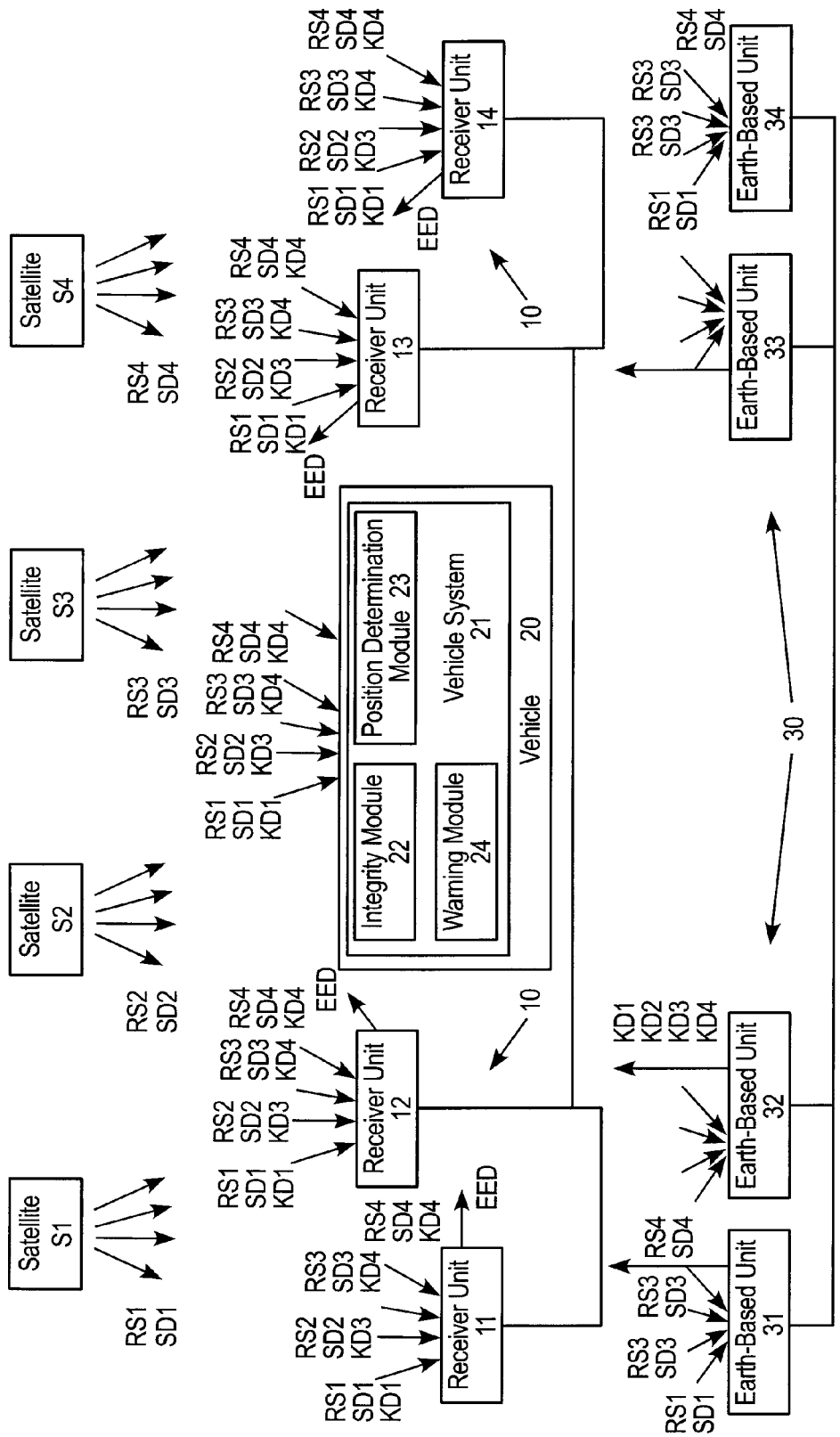

In a vehicle system 21, an integrity risk for the position data of a vehicle 20 is determined in an integrity module 22, the position data being derived from time determinations performed by a satellite navigation system. The integrity risk is determined from the satellite navigation system, by an optional earth-based prediction system, and by information provided by the earth-based receiver system for a predetermined alert limit. When the integrity risk for the position data exceeds a predetermined threshold value at the alert limit, the vehicle system generates a warning signal in a warning module 24, according to which the position data for a vehicle should not be used by the vehicle system or by a system linked thereto.

The vehicle system 21 may provide a signal that represents the functionality of the vehicle system 21, so that in exemplary embodiments of the present invention the lack of a warning signal is used only in conjunction with the signal for proper functioning, and thus the lack of the warning signal during defective functioning is not wrongly evaluated or used as a low integrity risk.

The connected module may be a display device for guiding the vehicle, by means of which the integrity of the position data or of modules which use the position data is displayed. The connected module may also be a functional component of a control system for the vehicle in order to influence the control of the vehicle, for example, an autopilot for an aircraft. The connected module may also be part of a control system by means of which the operating state of the control system is to be influenced, for example, to modify a type of operation. Such a module may be provided in an aircraft, for example, by means of which the transition between various categories, such as landing categories or safety levels may be made.

The predetermined threshold value for the integrity risk as well as the alert limit may be permanently stored or specified in the vehicle. Alternatively, a function may be implemented in the vehicle system by means of which this threshold value may be determined by the vehicle system as a function of the use situation of the vehicle or the type of operation of the vehicle system.

The position determination in a position determination module 23 is carried out in the vehicle system 21
- by use of satellite signals RS,
- by use of satellite data SD which are transmitted from the satellites to the vehicle system, and
- optionally by use of correction data KD which are transmitted from an earth-based prediction system 30 to the vehicle system.

The satellite signals are time markers and structures, i.e., repeating modulations on the signal which allow the particular transmitting satellite to be identified.

The satellite data are the predictions of the positions of the satellite, the deviation of the time for the particular satellite from the system time, and the parameters for the signal propagation model which the particular satellite transmits for its own state.

The position determination in the vehicle system 21 is carried out using measurements of the transit times of the satellite signals transmitted by the satellites as well as on the basis of the satellite data, and optionally the correction data which the vehicle system receives from the satellite or from the prediction system.

The reliability of the position data is also calculated in the integrity module in the vehicle system 21.

At least four satellites S1, S2, S3, S4 transmit satellite signals RS1, RS2, RS3, RS4 into the operational area of a receiver system 10. An operational area for the receiver system 10 is formed from at least three receiver units 11, 12, 13, 14 which are active, i.e., ready to receive and in interactive data exchange, all at the same time. In normal cases, for an operational area the size of Bavaria between 50 and 80 receiver units are active, i.e., ready to receive. The receiver system 10 is provided for determining deviations of the satellite signals from signals which are described by use of satellite data or correction data from the prediction system, and to transmit information derived therefrom to the vehicle system.

The vehicle system 21 must be located in the operational area of the receiver system and receive satellite signals from at least four satellites. Additional data to be applied for correcting the satellite signals are provided by a prediction system 30.

Predictions concerning corrections to the satellite data may optionally be transmitted via the earth-based prediction system 30 to the vehicle system. To this end, the prediction system 30 receives satellite signals and satellite data which are provided with reference numerals SD1, SD2, SD3, and SD4 with regard to the respective satellites in FIG. 1. In conventional applications the prediction system 30 is formed from a plurality of earth-based units 31, 32, 33, 34, and may be a system that is functionally independent from the receiver system 10, or may be a system that is coupled with or identical to the receiver system 10 or units thereof.

The data provided by the earth-based receiver system are used to calculate in the vehicle system the probability that, when satellite signals are used, the position errors which are marked as usable by the earth-based receiver system are greater than the alert limit. If this probability is greater than the threshold value, the above-described warning signal is generated.

To determine the information for calculating the integrity risk for the position data of a vehicle, the receiver system has a plurality of modules in mutual data connection. These modules determine in cooperation, i.e., based on the measurement of satellite signals, of the detection of satellite data and the detection of data which are transmitted by optional earth-based prediction systems 30 to the vehicle system, and a corresponding data exchange of the following measured values:
- the instantaneous satellite position and the instantaneous satellite time,
- the deviation between the satellite position and satellite time predicted for the particular point in time and the estimated satellite position and satellite time,
- the deviation between the nominal signal propagation from the satellite to the vehicle and the estimated actual signal propagation from the satellite to the vehicle,
- the deviation accuracy, i.e., the accuracy with which this deviation is determined,
- a threshold value above which the receiver system identifies the respective satellite signal received by same as erroneous, and
- the information concerning which satellites are recognized as defective by the receiver system.

These variables are separately determined for each satellite by corresponding data exchange between the modules of the receiver system.

The receiver system determines the threshold value
- to ascertain the situations in which a transmitting satellite is regarded as defective and to identify the corresponding satellite signals transmitted to the vehicle system as erroneous, and
- according to the invention to also provide the vehicle system with this threshold value for determining the integrity.

According to the invention, the threshold value may be determined on a satellite-specific basis. According to the invention, the variability of the satellite signal propagation may also be taken into account in the determination of the threshold value. This variability is taken into account in a transparent manner for the vehicle system.

The nominal signal propagation is a reference variable which is described by use of a standard model. The standard model is implemented in the vehicle system, it being possible for the particular instantaneous parameters of the standard model to be transmitted from the satellites or from the receiver system to the vehicle systems. Examples of parameters that may be used include the time of year, atmospheric variables such as air pressure, air moisture, or temperature, or the electron concentrations in a specified altitude range.

These parameters may also be parameterized as a function of altitude or in a spatial manner.

According to the invention, the receiver system 10 provides the following as input data for the vehicle system:
- the accuracy of the error estimation,
- a threshold value above which the receiver system identifies the respective satellite signal received by same as erroneous, and
- the information concerning which satellites are recognized as defective by the receiver system.

The threshold value may be different for each satellite, and may be time-dependent of external parameters such as the observability of the satellite.

Based on these data, the vehicle system evaluates in an integrity module the integrity risk for the particular user or vehicle situation. Only satellite signals which have not been recognized as erroneous by the receiver system are used.

The probability of large position errors of the vehicle unrecognized by the vehicle system decreases
- the more measurements that are available to the vehicle system and
- the more accurate these measurements of the vehicle system are,
- the fewer the errors in the data provided to the satellite navigation system and
- the more accurate the data provided by the earth-based receiver system are.

According to the invention, the integrity risk is determined using an estimated value for the error of the received satellite signal, wherein this estimated value is set to be equal to the received threshold value. The accuracy of this estimated value is set to be equal to the deviation accuracy transmitted from the receiver system to the vehicle system.

To this end, implemented in the vehicle system are a satellite navigation module for determining the position of the vehicle, and an integrity module having the following functions:
- a reception function for receiving the data from the earth-based receiver system which are intended for the vehicle system,
- a control module for checking these data for completeness and for unaltered reception within predetermined limits,
- a calculation module for calculating the probability that the position error in the position solution determined by the vehicle system is greater than the alert limit, and
- a warning module for generating a warning to connected systems, and additionally or alternatively for generating a signal at a linked system that the position data should not be used.

The calculation of the probability assumes that the position of the vehicle system and the positions of the respectively received satellites have been previously calculated in the vehicle system by a position determination module 22 in the vehicle system F, and that only satellite signals are used which have not been determined to be erroneous by the earth-based receiver system and have been transmitted to the vehicle system.

According to the invention, in the calculation of the probability it is assumed that the error distributions of all satellite signals after application of the satellite data and of the data provided by the optional prediction system have an expected value whose absolute value corresponds to the threshold value propagated by the earth-based receiver system for the particular satellite signal. The error distribution may be overbounded by a normal distribution having a variance corresponding to the variance of the error estimation for the particular satellite signal that is propagated by the receiver system.

The calculation of the probability, performed in the integrity module, that the position error is greater than the alert limit may be obtained according to the following formula, for example:

$$P_{IntRisk,H} = 1 - \chi^2_{2,\delta_{u,H}} cdf\left(\frac{HAL^2}{\xi^2}\right) \quad (1.1)$$

where HAL is the horizontal alert limit and $\chi_{2,\delta}\,cdf(x)$ is the cumulative non-central $\chi^2$ distribution of level 2 having the noncentrality parameter $\delta$. $\delta_{u,H}$ is calculated as follows:

$$\delta_{u,H} = (\mu_{u,n} \quad \mu_{u,e}) \cdot \begin{pmatrix} \xi^2 & 0 \\ 0 & \xi^2 \end{pmatrix} \cdot \begin{pmatrix} \mu_{u,n} \\ \mu_{u,e} \end{pmatrix}, \quad (1.2)$$

where $$\xi^2 = \frac{\sigma^2_{u,nn} + \sigma^2_{u,ee}}{2} + \sqrt{\left(\frac{\sigma^2_{u,nn} - \sigma^2_{u,ee}}{2}\right)^2 + \sigma^2_{u,ne}} \quad (1.3)$$

and $$\begin{pmatrix} \mu_{u,n} \\ \mu_{u,e} \end{pmatrix} = \begin{pmatrix} (M_{topo} \cdot b)[1] \\ (M_{topo} \cdot b)[2] \end{pmatrix} \quad (1.4)$$

These variables in turn are calculated from $$C_{topo}[1:2, 1:2] = \begin{pmatrix} \sigma^2_{u,nn} & \sigma_{u,ne} \\ \sigma_{u,ne} & \sigma^2_{u,ee} \end{pmatrix} \quad (1.5)$$

$C_{topo}$ is calculated as $$C_{topo} = M_{topo} \cdot C_{bb} \cdot M^T_{topo} \quad (1.6)$$

$$C_{bb} = \quad (1.7)$$

$$\begin{pmatrix} \sigma^2_{mon,1} + & & & & & & \\ \sigma^2_{u,L,1} & 0 & & \cdots & & & 0 \\ 0 & \ddots & & & & & \\ & & \sigma^2_{mon,j-1} + & & & & \\ & & \sigma^2_{u,L,j-1} & & & & \\ & & & \sigma^2_{mon,j} + & & & \vdots \\ \vdots & & & \sigma^2_{u,L,j} & & & \\ & & & & \sigma^2_{mon,j+1} + & & \\ & & & & \sigma^2_{u,L,j+1} & & \\ & & & & & \ddots & 0 \\ & & & & & & \sigma^2_{mon,N} + \\ 0 & & \cdots & & & 0 & \sigma^2_{u,L,N} \end{pmatrix}$$

and $$M_{topo} = n^T_{topo} \cdot (H^T P H)^{-1} H^T P \quad (1.8)$$

where $$n_{topo} = (n_n \quad n_e \quad n_u) \quad (1.9)$$

is the matrix composed of the unit vectors at the estimated positions of the vehicle system in the north, east, and zenith directions.

The matrix P is calculated as the inverse of the matrix $$C_U = \begin{pmatrix} \sigma^2_{u,RX,1} & 0 & & 0 \\ 0 & \ddots & 0 & & \vdots \\ \vdots & & \sigma^2_{u,RX,i} & & \vdots \\ \vdots & & 0 & \ddots & 0 \\ 0 & & & \ddots & \sigma^2_{u,RX,N} \end{pmatrix}, \quad (1.10)$$

where $\sigma^2_{u,RX,i}$ is the predicted standard deviation of the normal distribution which overbounds the error of the satellite signal, the satellite data, and the data from the base system for the signal from satellite i, and H $$H = \begin{pmatrix} -\frac{x_{s,1}-x_r}{R_{1,0}} & -\frac{y_{s,1}-y_r}{R_{1,0}} & -\frac{z_{s,1}-z_r}{R_{1,0}} & 1 \\ -\frac{x_{s,2}-x_r}{R_{2,0}} & -\frac{y_{s,2}-y_r}{R_{2,0}} & -\frac{z_{s,2}-z_r}{R_{2,0}} & 1 \\ \vdots & \vdots & \vdots & \vdots \\ -\frac{x_{s,N}-x_r}{R_{N,0}} & -\frac{y_{s,N}-y_r}{R_{N,0}} & -\frac{z_{s,N}-z_r}{R_{N,0}} & 1 \end{pmatrix} \quad (1.11)$$

is the design matrix of the position solution, where $x_{s,i}$, $y_{s,i}$, and $z_{s,i}$ are the coordinates of satellite i, and $x_r$, $y_r$, and $z_r$ are the coordinates of the vehicle system. $R_{i,0}$ is the geometric distance between the satellite and the position of the vehicle system.

The vector b $$b = \begin{pmatrix} (-1)^{\psi_1} TH_1 \\ \vdots \\ (-1)^{\psi_{j-1}} TH_{j-1} \\ (-1)^{\psi_j} TH_j \\ (-1)^{\psi_{j+1}} TH_{j+1} \\ \vdots \\ (-1)^{\psi_N} TH_N \end{pmatrix} \quad (1.12)$$

is determined in such a way that under the condition $$\psi = \begin{pmatrix} \psi_1 \\ \vdots \\ \psi_{j-1} \\ \psi_j \\ \psi_{j+1} \\ \vdots \\ \psi_N \end{pmatrix}, \psi_k \in \{1, 2\} \quad (1.13)$$

$$|M_{topo} \cdot b| \quad (1.14)$$

is a maximum.

$TH_i$ are the threshold values that are transmitted from the earth-based receiver system for satellite i to the vehicle system. $\sigma_{mon,i}$ are the standard deviations that are transmitted for the error estimation of the errors from satellite i from the earth-based receiver system for satellite i to the vehicle system. $\sigma_{u,L,i}$ are an estimation of the local measurement error and the local multipath for the vehicle system.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A vehicle system in a vehicle, comprising:
   a position determination module for determining position data of the vehicle using satellite signals received by an earth-based receiver system and an estimated value for error of said satellite signals; and
   an integrity module for determining an integrity risk for the position data, said integrity risk being derived using time determinations performed by a satellite navigation system; and
   a warning module for generating a warning signal to prevent, via modules connected to the vehicle system, use of the position data for the vehicle, if a threshold value for the integrity risk for the position data is exceeded; wherein
   said integrity risk is determined using the estimated value for error in the received satellite signals;
   for determining position data of the vehicle, said position determination module uses, from among said satellite signals, only satellite signals which, as a whole, have not been transmitted by the earth-based receiver system to the vehicle system as being erroneous;
   the estimated value for error of said satellite signals is set to be equal to said threshold value; and
   accuracy of the estimated value for error of said satellite signals is set to be equal to a deviation accuracy transmitted from the receiver system to the vehicle system.

2. The vehicle system of claim 1, wherein the algebraic sign of the estimated value is selected so as to maximize the integrity risk.

3. A receiver system that functionally interacts with a plurality of satellites to determine and transmit data to a vehicle system, the vehicle system including a position determination module for determining a position of a vehicle, and an integrity module for determining a probability that a position error is greater than an alert limit, wherein the receiver system includes a plurality of modules that determine:
   a position and an instantaneous time of a transmitting satellite,
   a deviation between the satellite position and satellite time predicted for a particular point in time and an estimated satellite position and satellite time,
   a deviation between a nominal signal propagation from the satellite to the vehicle and an estimated actual signal propagation from the satellite to the vehicle,
   a deviation accuracy of the deviation between the nominal signal propagation and the estimated actual signal propagation,
   a threshold value above which the receiver system identifies a respective satellite signal received by the receiver system as erroneous, and
   information concerning which satellites are recognized as defective by the receiver system, wherein
   the receiver system transmits, as input data for the vehicle system, accuracy of error estimation,
the information concerning which satellites are recognized as defective by the receiver system, and
the threshold value above which the receiver system identifies the respective satellite signal received by the receiver system as erroneous.

4. A method for controlling operating states of a vehicle system in a vehicle based on satellite signals, said method comprising:
determining position data of the vehicle using an estimated value for error of satellite signals received by an earth-based receiver system;
determining an integrity risk for the position data for the vehicle, the integrity risk being derived using time determinations performed by a satellite navigation system;
generating a warning signal via modules connected to the vehicle system to prevent use of the position data for the vehicle, if a threshold value for the integrity risk for the position data is exceeded, wherein
the integrity risk is determined using the estimated value for error of the received satellite signals,
for determining position data of the vehicle, said position determination module uses, from among said satellite signals, only satellite signals which, as a whole, have not been transmitted by the earth-based receiver system to the vehicle system as being erroneous,
the estimated value for error of the received satellite signals is set to be equal to the threshold value, and
the accuracy of the estimated value for error of the received satellite signals is set to be equal to a deviation accuracy transmitted from the receiver system to the vehicle system.

5. The method of claim 4, wherein the algebraic sign of the estimated value for error of the received satellite signals is selected so as to maximize the integrity risk.

* * * * *